US007007445B2

(12) United States Patent
Louviere

(10) Patent No.: US 7,007,445 B2
(45) Date of Patent: *Mar. 7, 2006

(54) METHOD OF MAKING A PLURALITY OF INTERCONNECTED VIALS

(76) Inventor: Kent A. Louviere, 314 School Board Dr., New Iberia, LA (US) 70560

( * ) Notice: Subject to any disclaimer, the term of this patent is extended or adjusted under 35 U.S.C. 154(b) by 0 days.

This patent is subject to a terminal disclaimer.

(21) Appl. No.: 10/799,968

(22) Filed: Mar. 10, 2004

(65) Prior Publication Data
US 2004/0222560 A1 Nov. 11, 2004

Related U.S. Application Data

(63) Continuation of application No. 09/594,528, filed on Jun. 14, 2000, now Pat. No. 6,735,926, which is a continuation-in-part of application No. 09/054,905, filed on Apr. 3, 1998, now Pat. No. 6,101,791.

(51) Int. Cl.
*B29C 45/36* (2006.01)
(52) U.S. Cl. .................... 53/467; 53/477; 264/297.2; 264/318; 264/328.8; 425/577; 425/588; 156/69; 156/308.4; 156/583.1; 156/583.8; 156/583.9
(58) Field of Classification Search ............ 264/297.2, 264/318, 328.8; 425/577, 588; 156/69, 156/308.4, 583.1, 583.8, 583.9; 53/467, 53/477
See application file for complete search history.

(56) References Cited

U.S. PATENT DOCUMENTS

| 3,461,010 A | 8/1969 | Graham |
| 3,765,144 A | 10/1973 | Scheisser |
| 3,917,120 A | 11/1975 | Larenz et al. |
| 4,359,361 A * | 11/1982 | Wright ........................ 156/497 |
| 4,512,475 A | 4/1985 | Federighi |
| 4,530,202 A | 7/1985 | Powell et al. |
| D282,348 S | 1/1986 | Federighi |
| 4,959,005 A | 9/1990 | Sorensen |
| 5,015,426 A | 5/1991 | Maus et al. |
| 5,040,963 A | 8/1991 | Beck et al. |
| 5,139,714 A | 8/1992 | Hettinga |
| 5,346,659 A | 9/1994 | Buhler et al. |
| 5,560,939 A | 10/1996 | Nakagawa et al. |
| 5,736,173 A | 4/1998 | Wright et al. |
| 6,164,044 A | 12/2000 | Porfano et al. |
| 6,336,489 B1 | 1/2002 | McGahhey |

FOREIGN PATENT DOCUMENTS

JP         11-100008         *  4/1999

* cited by examiner

*Primary Examiner*—Stefan Staicovici
(74) *Attorney, Agent, or Firm*—C. Dean Domingue; Robert L. Waddell; Ted A. Anthony

(57) ABSTRACT

A method of manufacturing a row of encapsulated interconnected vials with the mold. The method includes forming a plurality of cavity profiles linked together by arms, and inserting a plurality of core pins into the cavity profiles. The method includes injecting a plastic fluid about the core pins to form a row of interconnected vials. The method includes removing the row of interconnected vials and positioning the row into a holding tray. The method further includes placing the liquid into the row of interconnected vials with an injection device. An open end of the row of interconnected vials is heat-sealed. The step of heat-sealing may include applying heat, measuring the temperature, and measuring the time heat is applied.

10 Claims, 15 Drawing Sheets

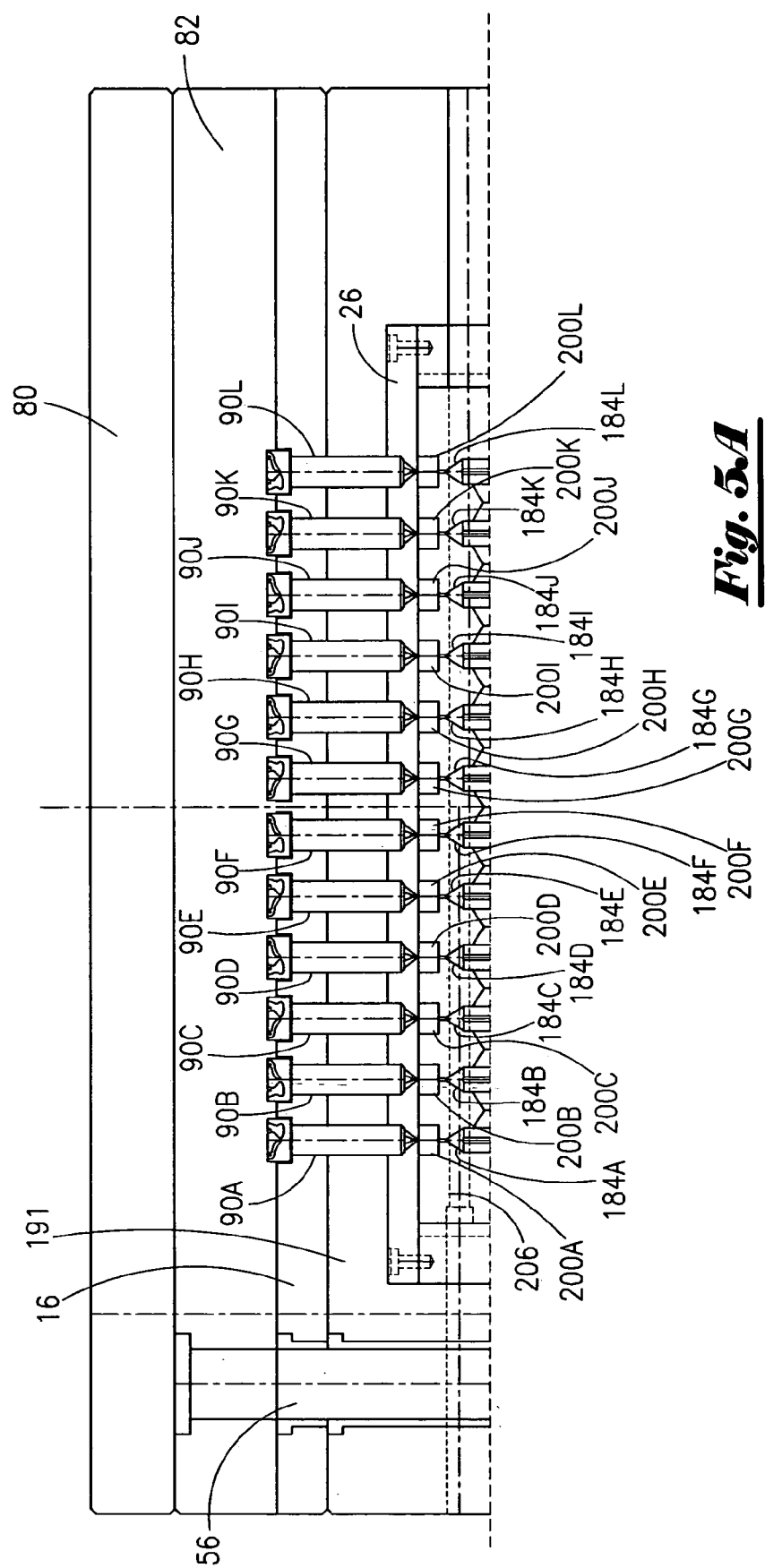

METHOD OF MAKING A PLURALITY OF INTERCONNECTED VIALS

This application is a continuation application from patent application bearing Ser. No. 09/594,528 filed on 14 Jun. 2000 now U.S. Pat. No. 6,735,926, which is a continuation in part of application bearing Ser. No. 09/054,905 filed on 3 Apr. 1998, now U.S. Pat. No. 6,101,791. This invention relates to a method and apparatus for molding a container. More particularly, but not by way of limitation, this invention relates to an apparatus and method for molding a container that has a closed end and an opened end, and wherein a material may be placed therein followed by the closing of the open end.

BACKGROUND OF THE INVENTION

The injection molding of plastics is used to create a number of different objects such as caps, lids, and other plastic components. The prior art injection molding will consist of melting a plastic into a fluid state and injecting the liquid plastic into a mold. The mold will generally consist of a first section and a second section. The first section and the second section cooperate to form a mold cavity. The liquid plastic is injected into the mold. Thereafter, the liquid plastic is allowed to cool. The molded plastic article is then ejected from the mold, as is understood by those of ordinary skill in the art.

Prior art patents such as U.S. Pat. No. 5,560,939 to Nakagawa entitled "MOLD ASSEMBLY COMPRISING A SLIDING MOLD INSERT ADAPTED FOR AUTOMATED INSERTION AND REMOVAL" provide a mold insert that is reciprocally movable with the mold insert coupling portion. Also, in U.S. Pat. No. 5,346,659 to Buhler et al entitled "METHOD FOR PRODUCING A WELD-LINE FREE INJECTION MOLDED PLASTIC CONTAINER BODY PORTION", the inventor describes an injection molding mechanism and method of its use for the formation in a single sequence of operation of weld-line free cylindrical container body having a central opening at one end. In yet another prior art device, U.S. Pat. No. 5,139,714 to Hettinga teaches a process for injection molding a hollow plastic article in which a low pressure heat-activated gas is injected in combination with a plastic material into a mold cavity of a plastic injection mold unit.

Despite these prior art molding techniques, there is a need for a mold apparatus and method that will produce a container that generally includes a closed end, an opened end, and a hollow inner member that can hold materials. For instance, the container may hold a medicine such as a drug in tablet form. Alternatively, the container may be capable of holding medicine in liquid form. After placement of the medicine within the container, the open end may be closed according to prior art techniques such as a heat seal.

SUMMARY OF THE INVENTION

A device for molding a container is disclosed. The device will include a first member including an opening defined therein. A manifold member operatively attached to the first end of the first member for channeling a plastic fluid to an insert means is included. The insert means are positioned within the opening located within the first member, with the insert containing a first slide and a second slide. The first slide and second slide will have an extended position and a contracted position, and wherein the contracted position defines a cavity profile.

The second member will have a first end that contains a plurality of core pins. A piston is adapted to the second end of the second member for reciprocating the second member into engagement with the insert so that the first slide and second slide are moved to the contracted position. During the reciprocating motion, the plurality of core pins are received in the cavity profile. The apparatus will further comprise heater means for suppling a heat to the manifold means so that the plastic remains fluid. In one embodiment, the manifold member comprises a first plate with a first channel therein for channeling the plastic fluid therethrough and a second plate with a second channel therein cooperating with the first channel from the first plate for channeling the plastic fluid to the insert means.

The apparatus will further contain a first water supply means connected to the insert to supply a water to the insert. The apparatus will further contain a second water supply means connected to the first member. In the preferred embodiment, a cast heater element, operatively attached to the heater means is positioned within the first member so that the plastic fluid is heated before entering the insert. The water supply means may also connect to the first slide and to the second slide.

The apparatus may further comprise a first spring means, operatively associated with the first insert, for biasing the first slide outward from the opening, and second spring means, operatively associated with the second insert, for biasing the second slide outward from the opening. In the preferred embodiment, the reciprocating member comprises a piston operatively attached to the second member and wherein the second member comprises a retainer plate operatively attached to the piston and a stripper plate being operatively attached to the piston, the stripper plate being selectively detachable from the retainer plate. Also, a third water supply means for supplying a water stream to the core pins, and a fourth water supply means for supplying a water stream to the retainer plate is included. The apparatus may further comprise a second insert, with the second insert being biased with a second spring means, operatively associated with the second insert.

Also described herewith is a method of casting a container with a mold. The mold will include a first member that has an opening defined within a first end. The mold will further include a manifold member operatively attached to the first end of the first member for channeling a plastic fluid to an insert means. The insert means is positioned within an opening located within the first member, the insert means containing a first slide and a second slide, with the first slide and second slide having an extended position and a contracted position.

The mold will also contain a second member having a plurality of core pins contained thereon; and, a piston adapted to the second member for reciprocating the second member into engagement with the insert means. Therefore, the method comprises heating a plastic so that a plastic fluid is formed, and thereafter channeling the plastic fluid into the manifold. Next, the plastic fluid is heated within the manifold and the plastic fluid is channeled through the first member and into the first slide and second slide. Next, the piston is moved so that the second member contacts the first slide and the second slide which in turn causes the contraction of the first slide and the second slide so that a cavity profile is formed. The core pins are placed into the cavity profile. The method allows for the injection of the plastic fluid into the cavity profile, and in turn, casting the plastic fluid about the core pins so that a container is formed.

In one embodiment, the first member further comprises cast heaters operatively associated with the first and second slide, and wherein the method further comprises heating the plastic fluid with the cast heaters, and wherein the step of channeling the plastic fluid through the first member and into the first and second slide includes flowing the plastic fluid through the cast heater so that the plastic fluid is maintained at a constant temperature.

The method further comprises introducing a first water stream into the first slide and introducing the first water stream into the second slide. The first water stream is circulated within the first member, and then exited from the first member. A second water stream may be introduced into the core pins, and the method includes circulating the second water stream within the core pins. Next, the second water stream is exited from the plurality of core pins. In the preferred embodiment, the temperature of the plastic fluid within the manifold is measured. The temperature of the heater is adjusted in order to maintain the fluidity of the plastic. The method may further include measuring the temperature of the plastic fluid within the first slide and the second slide and adjusting the temperature of the cast heater in order to maintain the plastic fluidity.

The mold may further contain an ejector plate operatively associated with the second member. The method further consist of reciprocating the piston away from the first end of the first member and allowing the first slide and second slide to expand. Next, the piston is reciprocated so that the ejector plate traverses the plurality of core pins so that the container surrounding the core pins is ejected.

The method may also include filling the container with a material. The material may be a drug in tablet form, or alternatively, the material may be a drug in a liquid form. A precise amount of material may be placed within the container. After the material is placed therein, the method may further include sealing the container by sealing the open end of the container.

In a second embodiment, which is the preferred embodiment of this application, a method of manufacturing a plurality of encapsulated interconnected vials is disclosed. The mold has a first member having attached thereto a plurality of core pins and a second member containing a first slide and a second slide. The first and second slide have an extended position and a contracted position. The method comprises contracting the first and second slide so that a plurality of cavity profiles linked together by a plurality of arms is formed.

Next, the plurality of core pins on the first member is inserted into the plurality of cavity profiles so that the plurality of core pins are free standing and a plastic fluid is injected about the plurality of core pins to form a plurality of interconnected vials. Thereafter, the plurality of interconnected vials is ejected from the plurality of core pins.

Next, the plurality of interconnected vials is arranged into a holder tray and a compound is then placed into the plurality of interconnected vials. The open end is heat sealed in order to encapsulate the plurality of interconnected vials. The step of heat sealing includes clamping the plurality of interconnected vials into a heat sealing device. In the preferred embodiment, the heat sealing device contains a first arm and a second arm.

Thus, the first arm is lowered into engagement with the second arm and heat is applied to the first arm. The temperature of the first arm is measured, and the time that heat is applied to the first arm is also measured. The method further comprises terminating the heat applied to the first arm after a predetermined time and unclasping the first arm from the second arm. The plurality of interconnected vials is removed from the holder.

In the most preferred embodiment, the compound is a liquid and the liquid comprises a medicine and wherein the step of placing the liquid into the plurality of interconnected vials includes measuring a predetermined amount of medicine and injecting the predetermined amount into the plurality of interconnected vials.

Additionally, in one of the embodiments, the step of heat sealing includes clamping the plurality of interconnected vials into a heat sealing device, and wherein the heat sealing device contains a first arm and a second arm. The first arm is lowered into engagement with the second arm, and heat is applied to the first arm. The temperature of the first arm is measured. A predetermined maximum temperature is set. Once the predetermined maximum temperature is exceeded, the heat applied is terminated.

An advantage of the present invention includes the production of a hollow plastic article. Another advantage is the production of a container having a first end that is closed, and a second end that is opened. Yet another advantage is that after processing, the container can be filled with a material; thereafter, the open end may be sealed. Another advantage is that the material to be placed within the container may include a drug in liquid form or tablet form. Still yet another advantage is that an exact amount of the material (such as a pharmaceutical prescription) may be added into each individual container, and thereafter sealed. Another advantage is the use of a resin that allows for suitable flow properties during injection. Yet another advantage is the process leaves a small seam parting line about the produced product.

Yet another advantage is that the novel heat sealer device herein disclosed allows for sealing an interconnected row of vials. Another advantage is that the heat sealer device measures the time that heat is applied in order to seal the vials. Additionally, the heat sealer device measures the temperature, with a maximum temperature cut-off. Still yet another advantage is the injection of the material (including liquid) into the plurality of interconnected vials while the vials are positioned within a holder tray.

A feature of the present invention includes having a mold that contains a first stationary mold half and a second traveling mold half. Another feature of the present invention includes use of a sliding insert which is constructed in two cooperating halves. The sliding insert is fitted into an opening within the stationary mold half. Yet another feature includes the sliding insert is biased within the opening so that there is an expanded position. Another feature includes that the sliding insert may be biased into a contracted position by the traveling mold half Another feature includes a cavity profile is formed when the sliding insert is moved to the contracted position. In the preferred embodiment, the sliding insert contains a plurality of cavity profiles. Another feature includes a core pin is positioned on the traveling mold half, with the core pin being sized as to fit into the cavity profile. Still yet another feature includes a plurality of core pins may be attached to the traveling mold half, that cooperate with the cavity profiles of the sliding insert. Still yet another feature includes the core pins within the cavity profile form an annulus into which the plastic fluid is injected.

Yet another feature is the application of heat means to heat the manifold in order to keep the fluid plastic at the proper temperature. Another feature is the application of cast heaters to keep the plastic fluid at the proper temperature within the cavity profile during injection. Still yet another feature includes use of a water stream that cools the sliding inserts. Another feature is the use of a water stream injected within the core pin in order to cool the core pin. Yet another feature is having a free standing core pin that is not anchored within the cavity profile during the injection process.

BRIEF DESCRIPTION OF THE DRAWINGS

FIGS. 5A & 5B are a cross-sectional view of the mold apparatus taken along line B—B of FIG. 2.

DETAILED DESCRIPTION OF THE PREFERRED EMBODIMENTS

Figure 1:
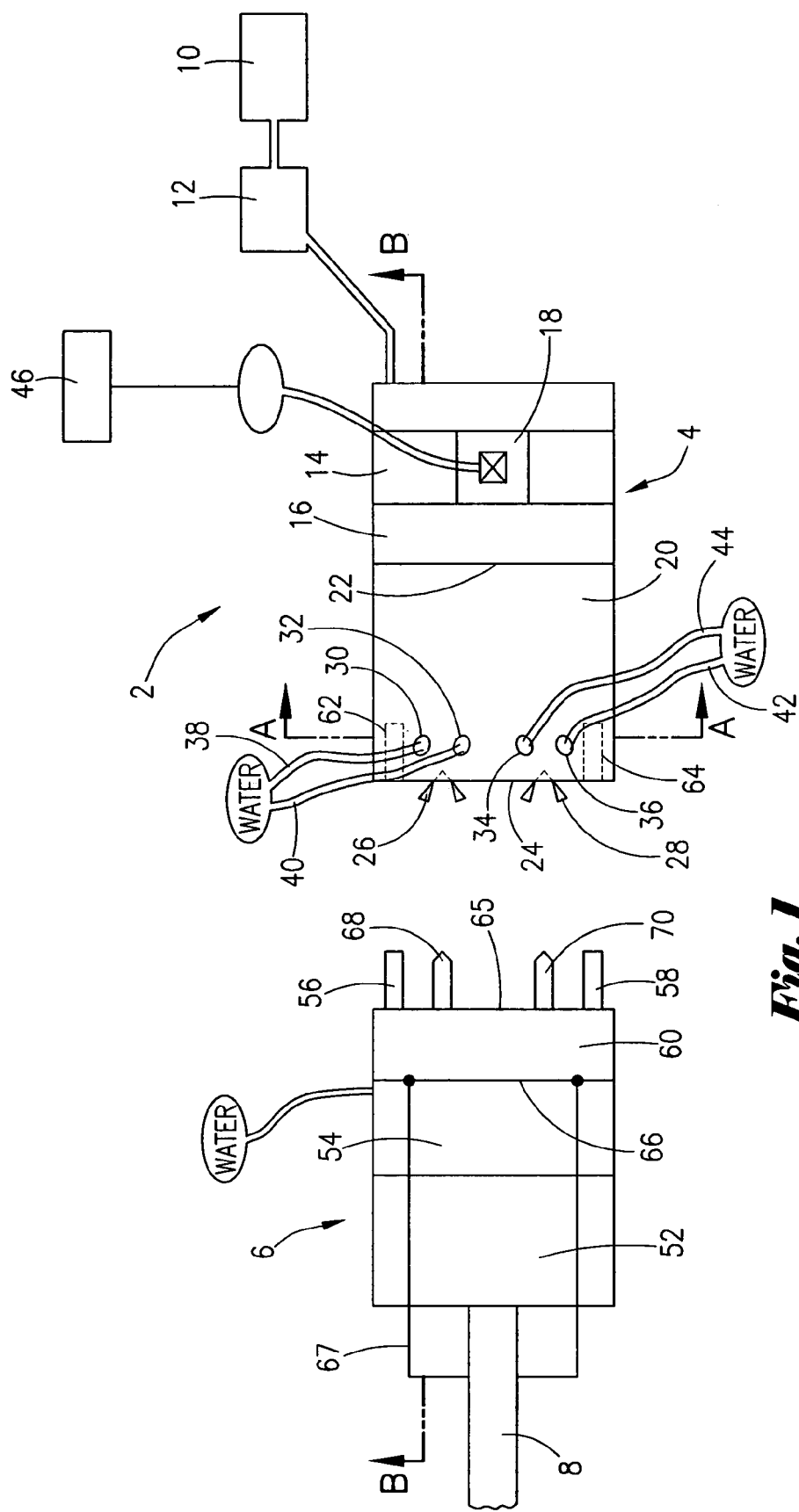
FIG. 1 is a perspective view of the mold apparatus of the present invention.

Referring to FIG. 1, a perspective view of the mold apparatus 2 of the present invention will now be described. The mold apparatus 2 generally consist of a first member 4 (also referred to as the hot half) that will be stationary during the process herein disclosed as well as a second member 6 (also referred to as the cold half) that is reciprocally movable into engagement with the first member 4 via the piston 8. The mold apparatus 2 will have operatively associated therewith a plastic supply 10 that is fed into a heater bin 12 where the plastic is made into a fluid (sometimes referred to as fluidize) so that the plastic can be flowed through the mold as will be further described. In the preferred embodiment, the plastic supply used is a resin which can be purchased from Dow Chemical Company under the trade name Metallocene Resin PT 1450. It has been found by applicant that this plastic resin sustains superior flow and curing properties under the system and method herein disclosed. During injection, this resin exhibits superior flow and cure properties so that the fluid plastic may be injected about the free standing core pin. The prior art injection molds exhibit poor flow qualities about free standing core pins (such as the free standing core pin described herein); therefore, the teachings of this application solve this problem. Also, the novel system (including the disclosed resin) leaves an acceptable seam-line about the produced product. Prior art products contain large seam lines which are undesirable for several reasons including but not limited to an inherently weak joining plane as well as being bulky.

The first member 4 will comprise a manifold plate 14 that contains therein an inlet for receiving the fluid plastic as well as a channel means for channeling the fluid plastic to the retainer plate 16. The manifold plate 14 will also contain heating means 18 for heating the manifold plate 14. The heating means 18 generates an electrical heat that keeps the plastic fluid at the proper temperature in order to ensure the proper flow properties, as will be understood by those of ordinary skill in the art.

Figure 2:
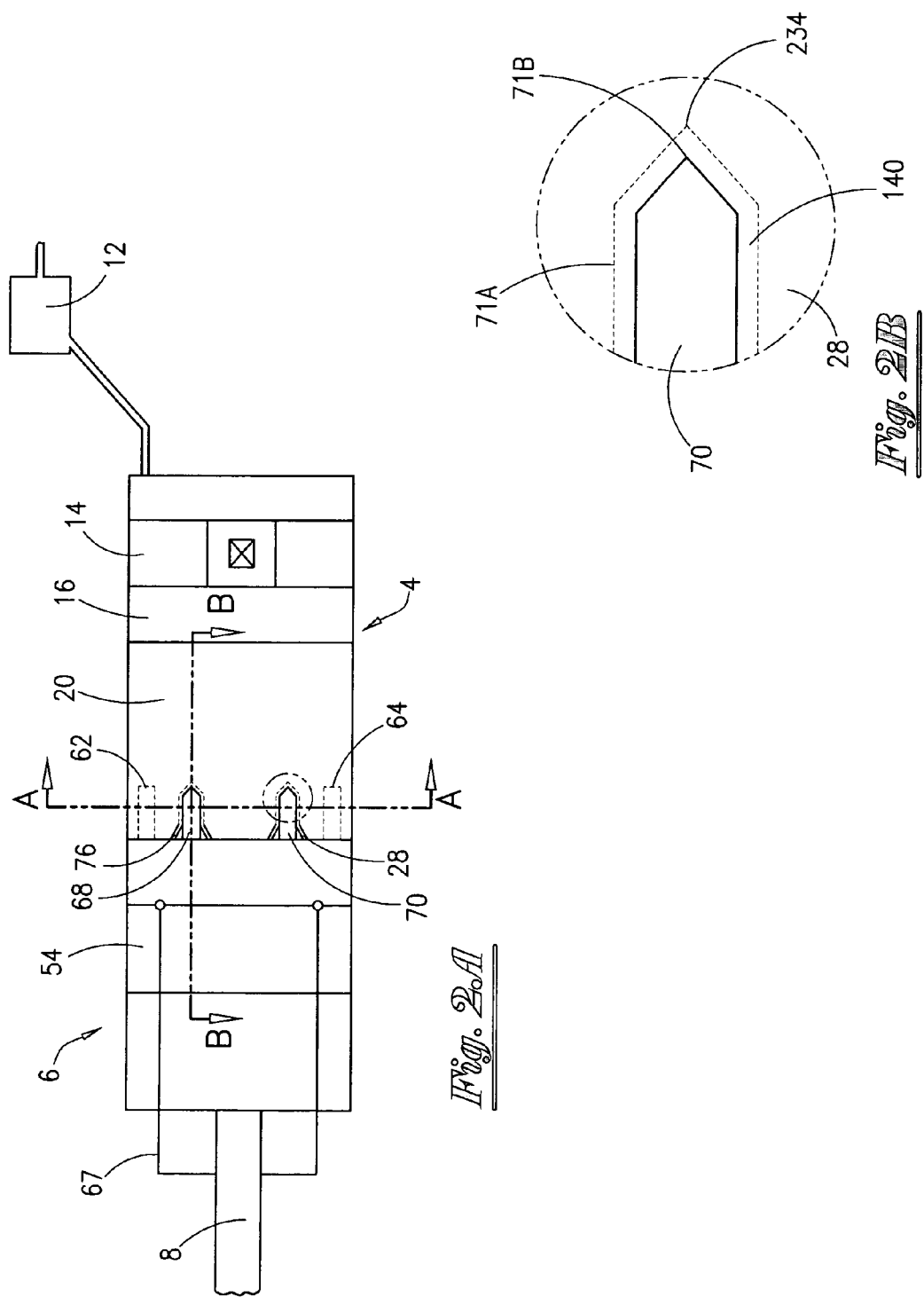
FIG. 2A is the mold apparatus of FIG. 1 with the cold half of the mold advanced against the hot half of the mold.
FIG. 2B is an expanded view of FIG. 2A showing the core pin within the cavity profile.
Figure 3:
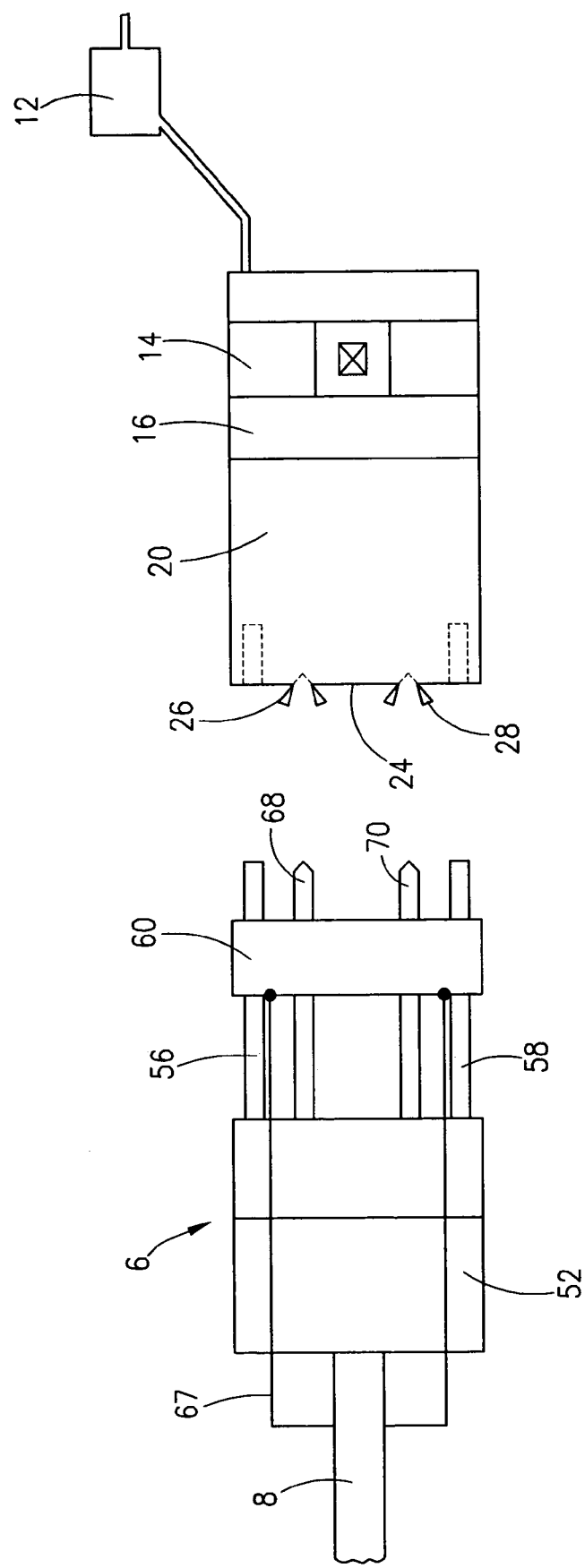
FIG. 3 is the mold apparatus of FIG. 1 with the cold half having been retreated and with the ejector plate advanced.

The retainer plate 16 is operatively attached to the mold base 20, with the mold base 20 having a first end face 22 and a second end face 24. The first end face 22 is attached to the retainer plate 16 and receives the fluid plastic. The second end face 24 will cooperate with the second member 6 as will be more fully explained. The second end face 24 contains an opening that will have disposed therein the slide insert members 26 and 28. The slide insert members 26, 28 are constructed in halves, with insert members 26, 28 being biased outward from the second end face 24. The slide insert members 26, 28 are wedged shaped. The slide insert members 26, 28 accommodate an extended position (such as shown in FIGS. 1 and 3) as well as a contracted position (as shown in FIG. 2). The slide insert members 26, 28 will be described in greater detail later in the application.

Also as seen in FIG. 1, the mold base 20 contains the openings 30, 32, 34, 36, with these openings allowing communication of a water stream line to the slide insert members 26, 28. Thus, the opening 30 will have the input/output? water lines 38, the opening 32 will have the input/output water lines 40, the opening 34 will have the input/output water lines 42, and the opening 36 will have the input/output water lines 44.

The mold apparatus 2 will also have operatively associated therewith the controller means 46 for controlling the injection process which includes the injection of fluid plastic, measuring and adjusting the heat means and cast heaters, as well as monitoring the water input and output lines. The controller means 46 is well known in the art and is commercially available from American MSI Corporation under the mark 38 Zone Delta.

The second member 6 will generally consist of a bottom clamp plate 52, with the bottom clamp plate 52 being operatively attached to the piston 8. The retainer plate 54 is, in turn, operatively attached to the bottom clamp plate 52, with the retainer plate 54 having extending therefrom the guide pins 56, 58. The guide pins 56, 58 will cooperate with and serve as a guide rail for the ejector plate 60 as well as serving to guide the second member into engagement with the first member 4 by insertion of the guide pins 56, 58 into the cooperating apertures 62, 64. The ejector plate 60 has a first face 65 and a second face 66. The ejector plate 60 is selectively detachable from the second member 6 via the secondary piston 67.

The core pins 68, 70 are also depicted in FIG. 1. The core pins 68, 70 are operatively attached to the retainer plate 54, with the core pins 68, 70 extending outwardly through apertures contained in the ejector plate 60. The core pin 68 will be received within the slide insert 26 while the core pin 70 will be received within the slide insert 28. It should be noted that in the preferred embodiment, the retainer plate 54 may contain two rows of pins that would cooperate with two corresponding rows of insert members, with this feature being described in greater detail later in the application. The apparatus 2 will also contain a water input/output stream that will be fed into the second member 6 and ultimately into the core pins 68, 70.

Referring now to FIG. 2A, the mold apparatus 2 of FIG. 1 with the second member 6 (also referred to as the cold half) of the mold is seen advanced against the first member 4 (also referred to as the hot half) of the mold. It should be noted that like numbers appearing in the various figures refer to like components. Thus, the second member 6 has been advanced via the piston 8. The core pins 68, 70 have been advanced into the slide members 26, 28 respectively. The first face 65 is now abutted against the second face 24 of the first member 4. The advancement of the core pins 68, 70 and the second member 6, and in particular the first face 65, acts to contract the slide insert members 26, 28 via the biasing means. Once the insert slide members are contracted (as in the position seen in FIG. 2), a profile cavity is formed. The core pin inserted within the profile cavity will form an annulus into which the fluid plastic will be injected.

FIG. 2B is an expanded view of the core pin 68 received within the cavity profile 71A. The core pin 68 is not anchored within the cavity profile 71A. Instead, according to the novel teachings of this invention, the core pins 68 will be free standing within the cavity profile as depicted in FIG. 2B. This is accomplished by use of the novel design of the slide insert 26, 28. Additionally, use of the said resin (Metallocene) allows for proper thickness of the resin between the tip 71B of the core pin 68 and the insert 28. Thus, the fluid plastic is injected about the pin 68 without core pin 68 deflection. As mentioned earlier, the free standing core pins within a cavity profile have caused problems with the prior art injection molds including but not limited to the deflection of the core pin which in turn causes the product to have walls of irregular thickness, etc.

Once the fluid plastic is injected, the piston will retract so that the second member 6 is again placed in the position as seen in FIG. 1. At this time, a container of plastic is formed about the core pins 68, 70. Next, the process entails moving the ejector plate 60 via the secondary piston 67 so that the ejector plate 60 is advanced as seen in FIG. 3. The act of advancing will cause the plastic container disposed about the core pins to be ejected from the core pins. Also, the biasing means that act against the slide insert member 26, 28 will bias the slide insert members 26, 28 outward as seen in FIG. 3. Thereafter, the secondary piston 67 will retract causing the ejector plate 60 to travel to the position seen in FIG. 1. The process for injecting another series of articles may commence.

Figure 4A:
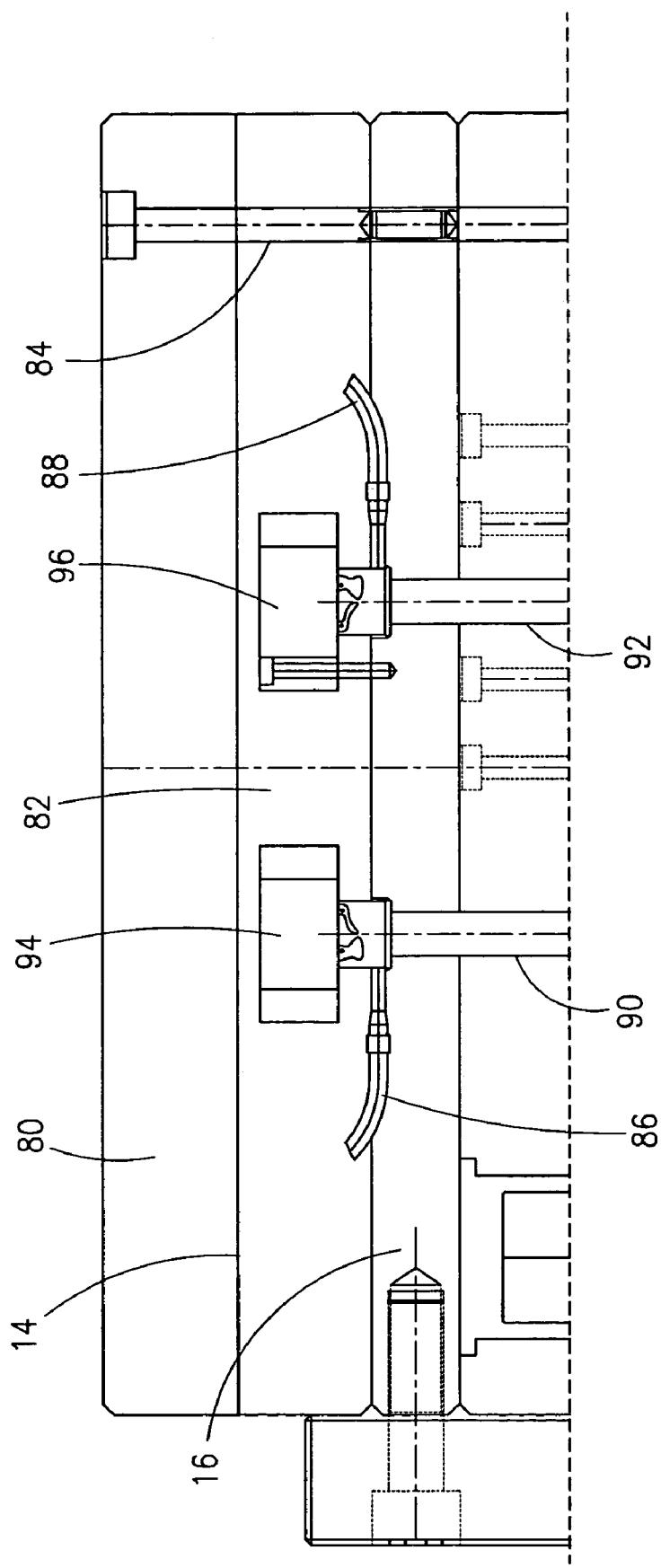
FIGS. 4A & 4B are a cross-sectional view of the mold apparatus taken along line A—A of FIG. 2.
Figure 4B:
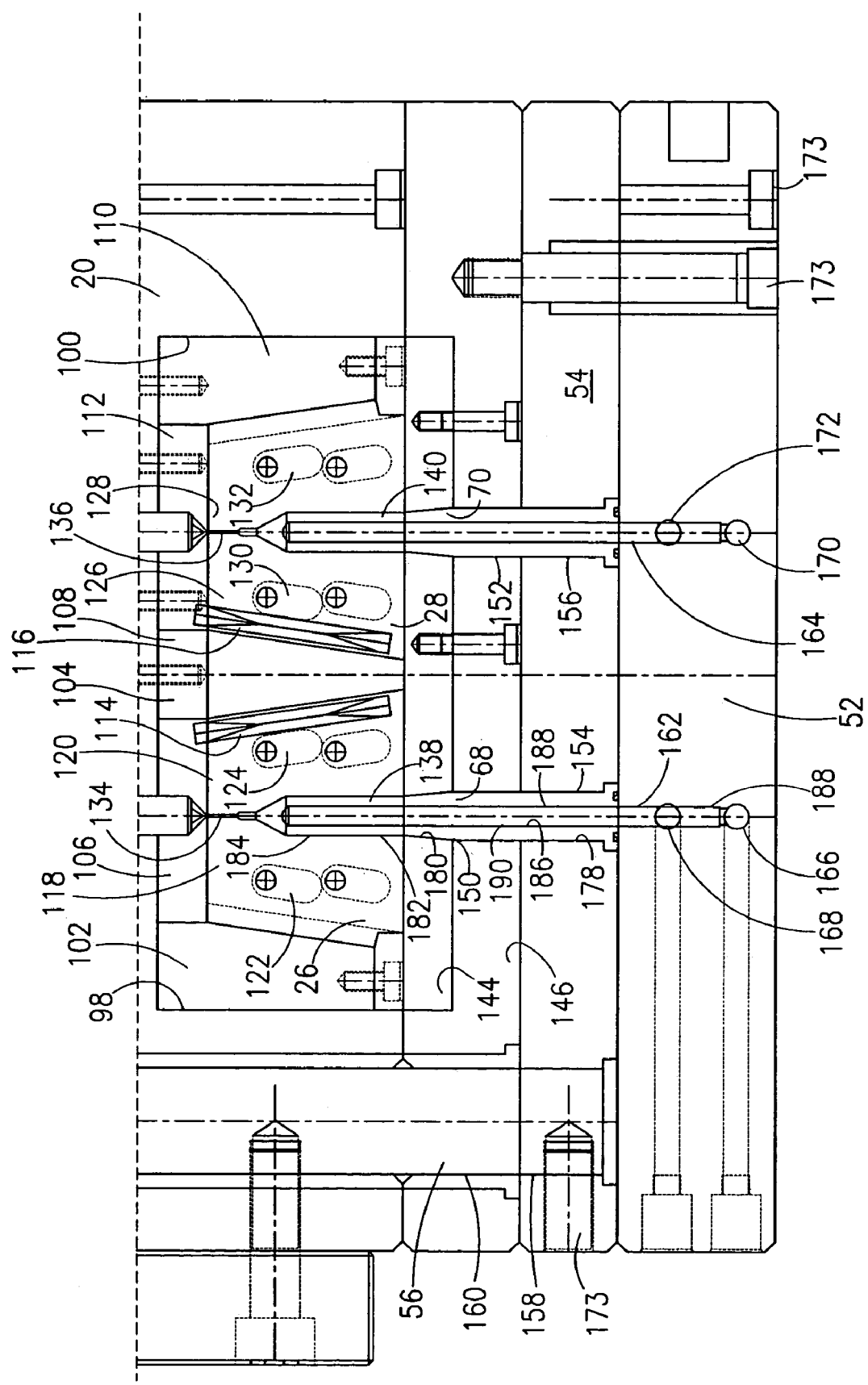

Referring now to FIGS. 4A-4B, a cross-sectional view of the mold apparatus 2 taken along line A—A of FIG. 2 will now be described. The first member 4 contains the manifold plate 14 which consist of a first section 80 and a second section 82, with the first section and second section containing the opening 84 for placement of a bolting member. The first member 4 further contains the retainer plate 16 that will have disposed therein channels for placement of the electrical wiring members 86 and 88, with the wiring members 86, 88 leading to the cast heater elements 90, 92. The cast heating elements 90, 92 are disposed within cavities within the retainer plate 16 as well as the mold base 20. The cast heating elements 90, 92 are generally tubular and will have an inner bore through which the fluid plastic will flow. The fluid plastic will be channeled from within the manifold 14 to the compartments 94, 96 and into the bore of the heating elements.

The mold base 20 will have openings 98, 100 for placement of the slide insert members 26, 28. In the preferred embodiments, the slide insert member 26 contains lock members 102, 104 associated with a retainer plate 106. The slide insert member 28 contains lock members 108, 110 associated with a retainer plate 112. The slide insert member 26 has the biasing means 114 for biasing the slide insert 26 outward, while the slide insert member 28 has the biasing means 116 for biasing the slide insert 28 outward. Also, the slide cams 118, 120 are included, with the slide cam 118 having the opening 122 and the slide cam 120 will have the opening 124 so that the water lines may be passed to the cams. The slide cams 126, 128 are also included, with the slide cam 126 having the opening 130 and the slide cam 128 will have the opening 132 so that the water lines may be passed to the fitted therein.

The slide cams 118 and 120 will come together to form the cavity profile into which the core pin 68 is fitted while the slide cams 126, 128 will come together to form another cavity profile into which the core pin 70 will cooperate. When the slide cams are retracted (as shown in FIGS. 4A and 4B) a first passage 134 and a second passage 136 is formed so that the fluid plastic may pass from the inner bore of the cast heaters to the annulus areas 138 and 140 of the cavity profiles. It should be noted that the mold base 20 will contain the openings for insert of the guide rails 56, 58.

The second member 6 will be described with reference to FIG. 4B. The second member 6 will contain a stripper insert 144 that is in turn attached to the ejector insert 146 and are collectively referred to as the ejector plate 60. As seen in FIG. 4B, the stripper insert 144 and ejector insert 146 are attached in order to operate together. The ejector plate 60 is selectively detachable from the retainer plate 54. The ejector plate 60 and retainer plate 54 both contain openings that has disposed therethrough the core pins 68, 70. As shown in FIG. 4, the ejector plate 60 has the openings 150, 152 and the retainer plate 54 has the openings 154, 156. The retainer plate 148 and the ejector plate 60 contain the openings 158, 160 respectively, for placement of the guide pins 56 (not shown is the guide pin 58).

The retainer plate 54 is in turn connected to the bottom clamp plate 52, as previously described, which in turn is connected to the piston 8. The bottom clamp plate 52 will contain the openings 162, 164. The opening 162 aligns with the openings 154, 150 and opening 164 aligns with the openings 156, 152. The core pin 68 is disposed in opening 162 and the core pin 70 is disposed in the opening 164. The core pins will generally consist of a cylindrical member that contains an inner bore, with the core pins being described in greater detail later in the application. The inner bore contains a concentric tubular member that forms an annulus. The bottom clamp plate 52 will contain a first channel 166 and a second channel 168 for a water stream input and output, with the first channel 166 injecting the water stream into inner bore and into the annulus and the second channel providing an outlet for the water stream from the annulus. There are also included the third channel 170 and fourth channel 172 that are provided for inputting and outputting a water stream to the core pin 70. The FIG. 4B also depicts the bores 173 for placement of attaching means such as bolts for attaching the various plates together.

Figure 7:
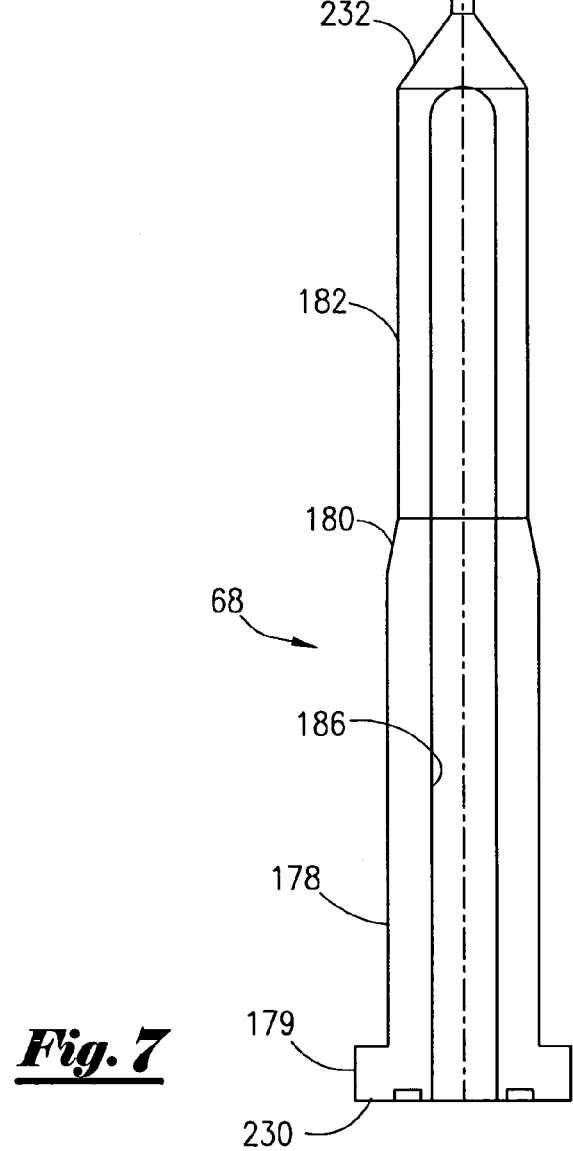
FIG. 7 is a cross-sectional illustration of a core pin.

The core pins disclosed herein are all of similar construction. The core pin 68 as seen in FIG. 7 has a first cylindrical surface 178 that includes a flanged section 179 with a seal therein, with the surface 178 surface extending to the chamfered surface 180 that in turn stretches to the second surface 182. As previously stated, an annulus 184 is created within the slide insert for injection of the fluid plastic. It should be noted that a metal-to-metal seal between the surface 180 and the plate 144 is formed so that the fluid plastic can not flow through the cold half 6. As noted earlier (and as seen in FIG. 4B), the core pin 68 contains the inner bore 186, with the inner bore 186 receiving a tubular member 188, with the tubular member 188 and the inner bore 186 forming another annulus 190. Thus, the water stream may be directed to the inner bore of the tubular member 188, out one end of the tubular member 188 and into the annulus 190, with the water channel 168 allowing an output for the water stream.

Figure 5B:
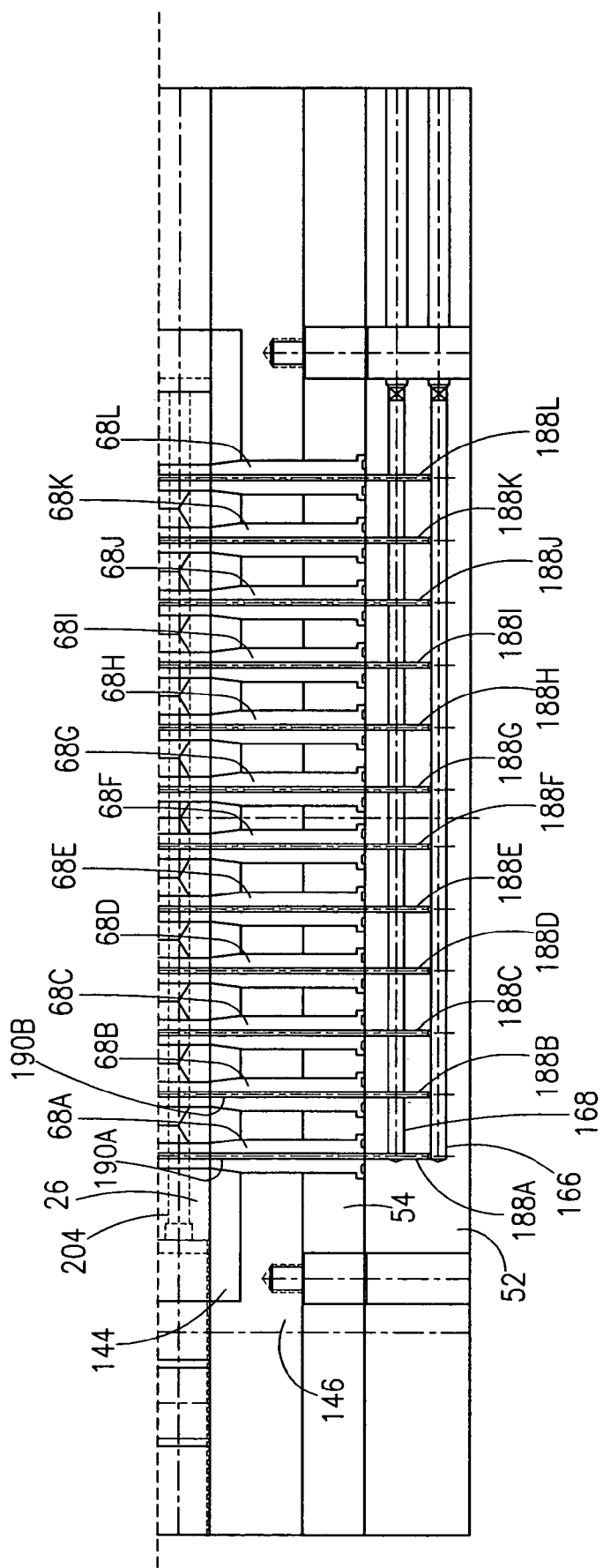
Figure 8:
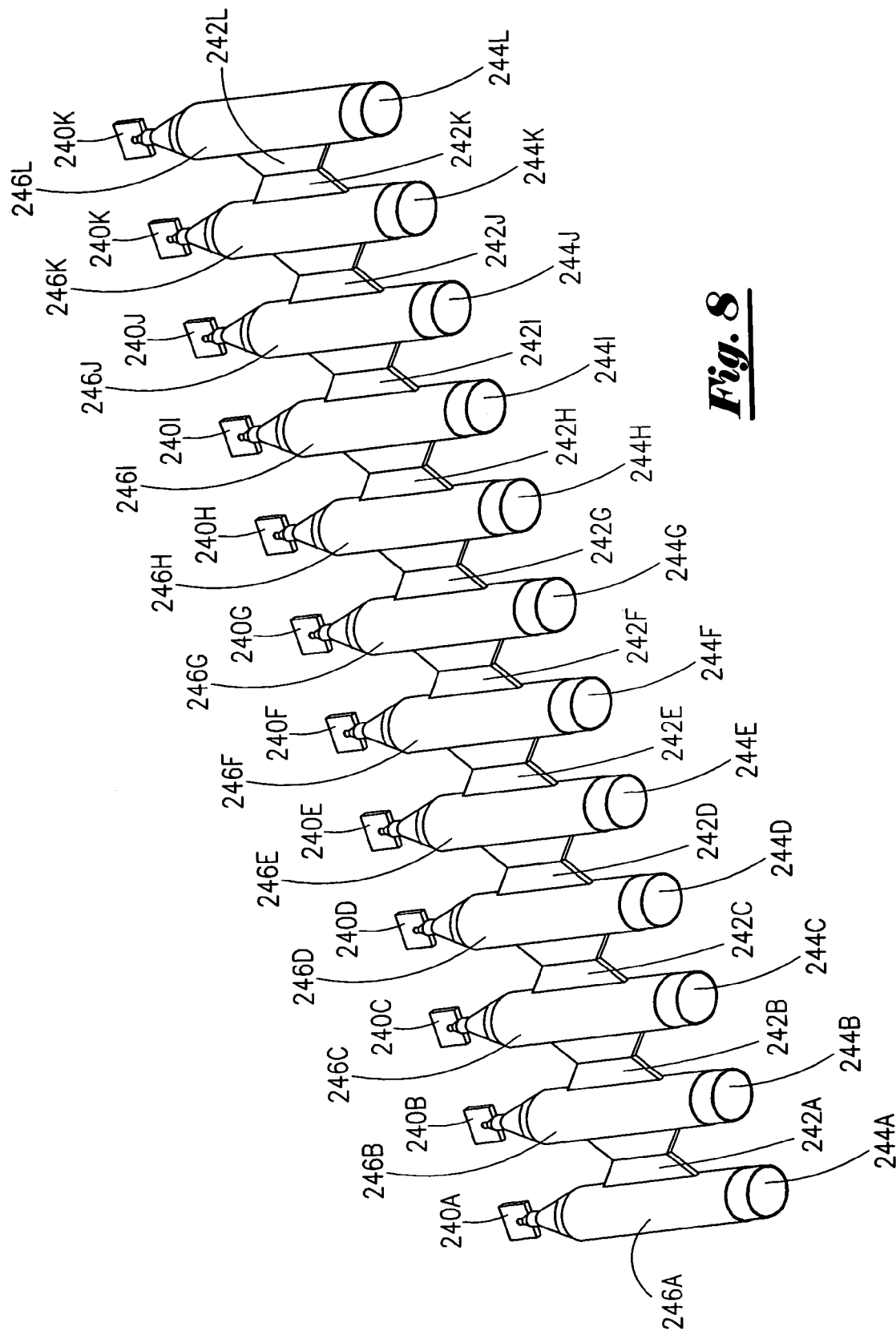
FIG. 8 is a perspective view of a row of molded hollow plastic articles.

Referring now to FIGS. 5A–5B, a cross-sectional view of the mold apparatus 2 taken along line B—B of FIG. 2 will now be described. Thus, the apparatus 2 includes the first section 80 that is operatively attached to the second section 82, which in turn leads to the gate insert 20. As illustrated in FIG. 5A, the preferred embodiment contains a row of cast heater elements including 90A, 90B, 90C, 90D, 90E, 90F, 90G, 90H, 90I, 90J, 90K, 90L. The row of cast heater elements leads to the slide insert member 26. When the slide insert member 26 is in the contracted position (as seen in FIGS. 5A and 5B), the annulus cavity profiles 184A–184L are formed. The slide insert member 26, in the contracted position, also forms a rectangular extension cavity for entry by the fluid plastic, with the rectangular extension cavity being generally seen from 200A–200L and with the rectangular cavities being in communication with the annulus cavity profiles 184A–184L. Also patterned by the disclosed design is the wing tip cavities 202A–202L that are formed once the slide insert member 26 is in the contracted position. The wing tip cavities 202A–202L are in communication with each other as seen in FIG. 8 such that once the molding process has been completed and the row has been ejected, the row is linked together. Also included will be the water channels 204, 206 for inputting, circulating and withdrawing a water stream from the insert member 26.

The cold half 6 is also depicted in FIGS. 5A–5B which includes the bottom clamp plate 52 that is attached to the retainer plate 54. The retainer plate 54 is selectively attachable to the ejector plate 60, with the ejector plate 60 containing the ejector insert 146 and the stripper insert 144 as previously described.

As shown in FIG. 5B, the invention includes the row of core pins 68A–68L and the concentrically placed tubular members 188A–188L. Therefore, a series of annuluses 190A–190L are formed for channeling the water as previously defined. FIG. 5 also depicts the water channels 166 and 168 that allow for channeling the water into and out of the tubular members 188A–188L. As shown, the water channel 166 connects with the inner bore and the water channel 168 connects with the annulus space 190 with the direction of flow in the preferred embodiment being from the water channel 166 through the inner bore, into the annulus space 190 and into the water channel 168 thereby cooling the core pins.

Figure 6A:
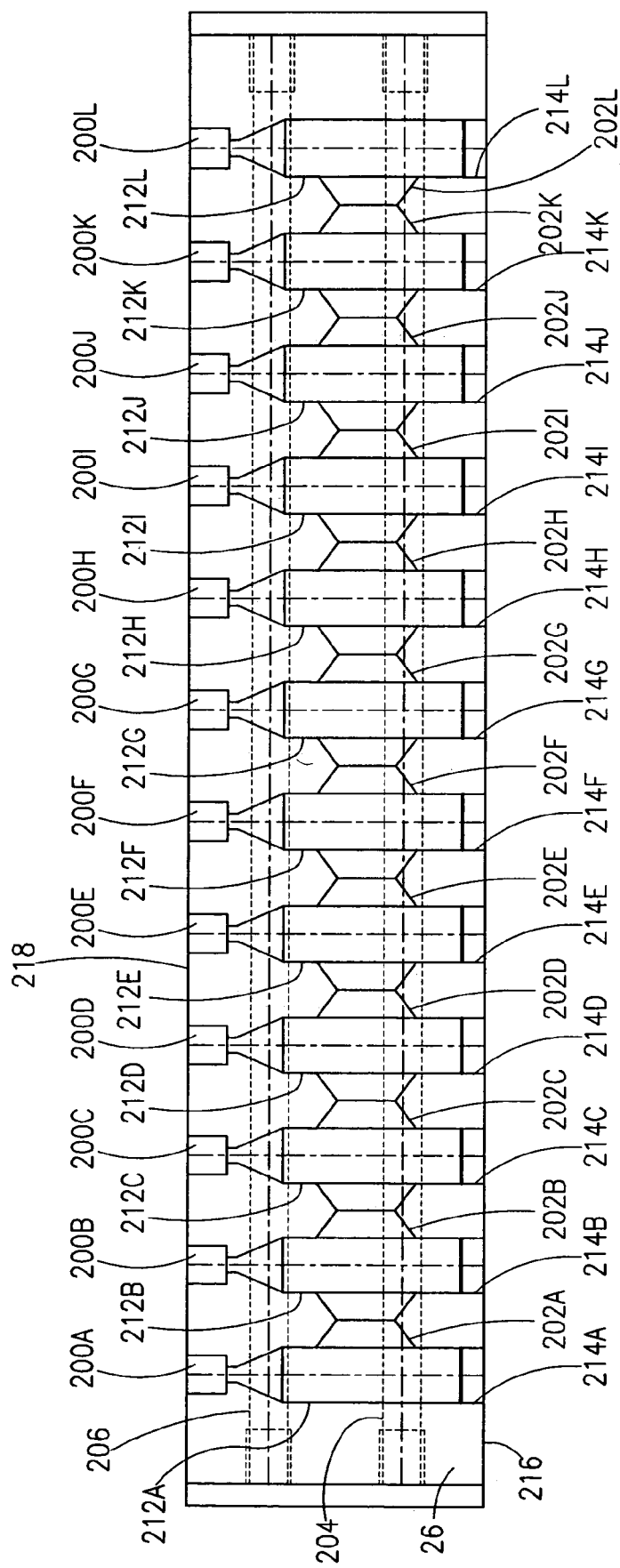
FIG. 6A, is the top view of one half of a slide insert member.
Figure 6B:
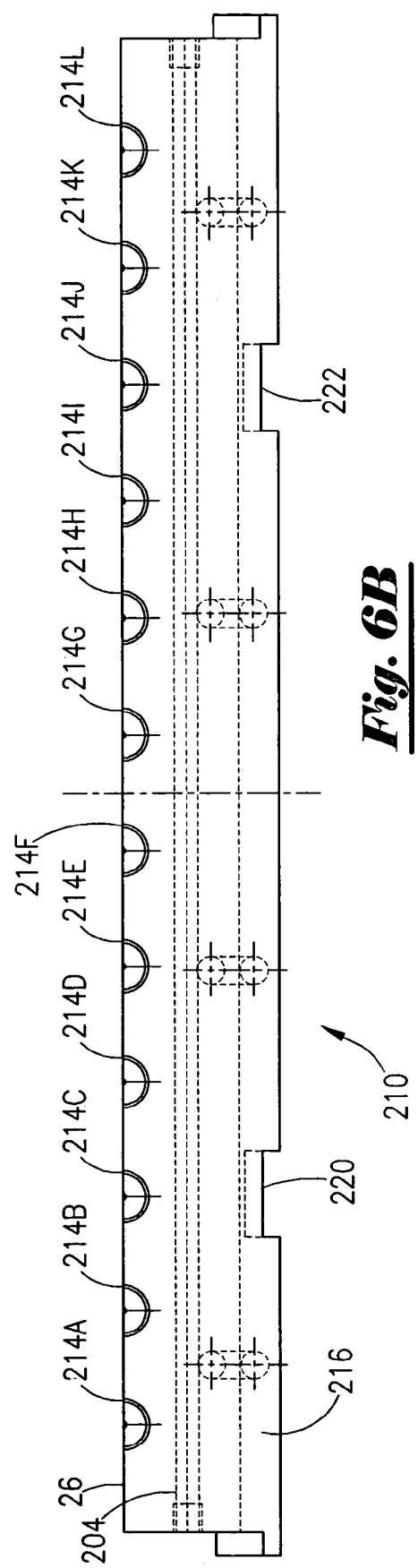
FIG. 6B is the front view of the slide insert member half of FIG. 6A.
Figure 6C:
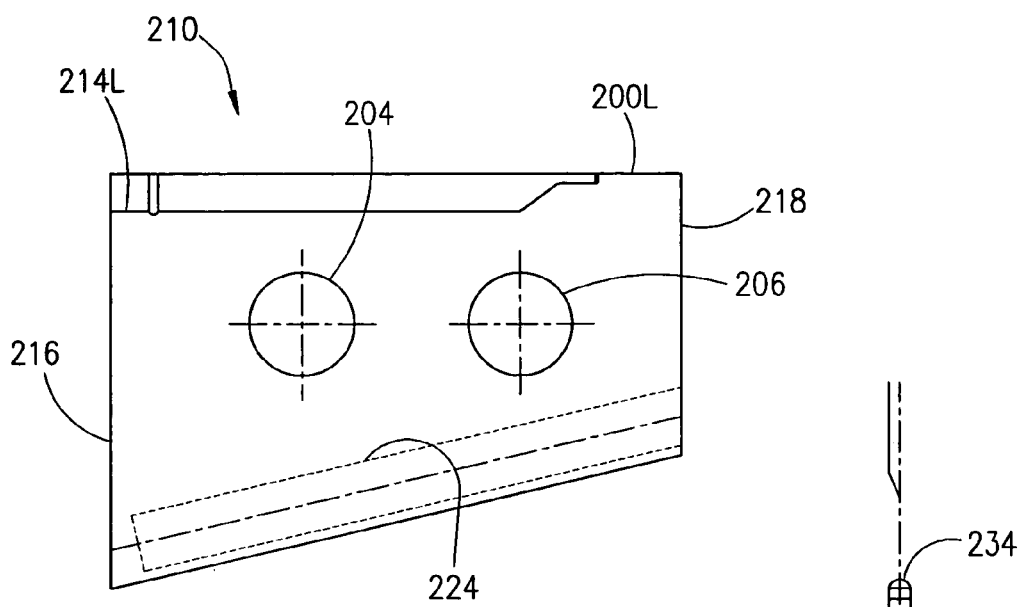
FIG. 6C is the side view of the slide insert member half of FIG. 6A.

Referring now to FIGS. 6A, 6B, and 6C, the cross-sectional view of one half of a slide insert member 26 will now be described. It should be noted that the two halves comprise the slide insert member 26. The FIG. 6A slide insert member half will be referred to as 210. Thus, the slide insert member half 210 includes the indentation profiles that forms the rectangular extension cavities 200A–200L, the container profile cavities 212A–212L, and the wing tip cavities 202A–202L. The container profile cavities 212A–212L will extend to the open end 214A–214L, with the open ends 214A–214L concluding at the insert slide face 216. The slide insert half also has the opposite slide face 218 that abuts the gate insert 20.

The FIG. 6B depicts the front view of the slide insert member half 210. Thus, the open ends 214A–214L are represented along the insert slide face 216. The front view also illustrates the notches 220 and 222. Referring now to FIG. 6C, the side view of the slide insert member half 210 will now be described. Thus, this view shows the member half 210 rotated so that the wedge configuration is depicted. As shown, the insert slide face 216 is longer than the insert slide face 218. The FIG. 6C also depicts the open end 214L and ensuing profile that extends to the rectangular extension 200L. The indention 224 is used for placement of the biasing means with the biasing means used to bias the insert member outward. In the preferred embodiment, the biasing means is a conical spring.

Referring now to FIG. 7, the core pin 68 will be described in greater detail. The flanged section 179 contains a radially flat surface 230 for placement of a seal means, such as an o-ring, for sealing with the face of the bottom clamp plate 52. The first cylindrical surface 178 leads to the chamfered surface 180 which in turn extends to the second cylindrical surface 182. A conical surface 232 stretches from surface 182, with the conical surface concluding at the apex 234. Once the apex area 234 has been inserted into the insert member, the apex 234 and insert member will cooperate to allow flow of the fluid plastic about the core pin 68. The core pin 68 also contains the inner bore 186, with the inner bore 186 extending to the closed end 236. As described earlier, the tubular member 188 will be disposed therein so that a fluid may be pumped down the tubular member 188 and up through the annulus 190 thus formed.

In FIG. 8, a perspective view of a row of molded hollow plastic articles will now be described. This is the row of articles of manufacture that is ejected via the ejector plate according to the teachings of the present invention. The rectangular extension cavity formed the rectangular extension top 240A–240L, and the wing tip cavity formed the wing tip arm 242A–242L. There is also the opened end 244A–244L of the container, with the plastic body of the container being represented by the numerals 246A–246L, with the row of containers 246A–246L being a product of the described process. It should also be noted that according to the teachings of the present invention, the design and resin herein disclosed, allows for minimum formation of a seam parting line. Whereas, in the prior art, significant seam parting lines will be formed in the casting of vials, for instance, in blow molding and/or injection techniques.

The method of molding a container with according to the teachings of the present invention will now be described. First, the plastic is heated so that a fluid plastic is formed which is then channeled into the manifold 18/80. The fluid plastic will also be heated within the manifold and is further heated via the cast heaters 90. The cast heaters allow for the fluid plastic to be held at a relatively constant temperature. The fluid plastic will be channeled through the first member 4 and into the first slide 26 and channeled through the first member 4 and into the second slide 28. The piston 8 will be moved so that the second member 6 contacts the first slide insert 26 and the second slide insert 28 which in turn will contract the first slide 26 and the second slide 28 so that the previously described cavity profiles are formed. Continued advancement of the second member 6 will place the plurality of core pins into the cavity profiles. The controller means 46 will then inject the fluid plastic into the cavity profiles and the plastic is cast about the plurality of core pins so that a container is formed.

The method also includes introducing a first water stream into the first slide 26 via the water input lines 38/40 through the channels 204,206, as well as introducing the first water stream into the second slide 28 via the water input lines 42/44 through the channels, with the water being circulated through and exited from the first member 4. The method will further include introducing a second water stream into the plurality of core pins 68/70 and circulating the second water stream within the plurality of core pins 68/70 and in turn exiting the second water stream from the plurality of core pins 68/70. During the process, the controller means 46 causes the measurement of the temperature of the fluid plastic within the first member 4 and in turn adjusting the temperature of the heaters in order to maintain the fluidity of the plastic. The method further comprises measuring the temperature of the fluid plastic within the first slide 26 and second slide 28 and in turn adjusting the temperature of the cast heaters 90A–90L in order to maintain the proper fluidity.

The method also includes reciprocating the piston 8 away from the end face 24 of the first member 4 so that the first slide 26 and second slide 28 are allowed to expand. As the second member 6 is withdrawn from contact with the hot half 4, the core pins 68/70 will have disposed thereon the deposited plastic. Next, the secondary piston 67 is allowed to advance so that the ejector plate 60 traverses the plurality of core pins 68/70 ejecting the containers from the plurality of core pins 68/70 so that the articles shown in FIG. 8 are formed.

The containers thus produced may be used a vial for medical purposes. Therefore, the method may further include providing a drug in a tablet embodiment and inserting the tablet into the open end of the vial (container). Next, the open end of the vial may be sealed so that the vial is a closed container. Alternatively, the method may include providing a drug in a liquid form and inserting the liquid into the open end of the vial, and thereafter, sealing the open end of the vial so that the vial is a closed container. The open end may be sealed via conventional means such as heat sealing. With the teachings of this invention, an exact amount of medicine may be placed within the vial, with the exact prescription depending on the patient's particular medical requirements.

Figure 9:
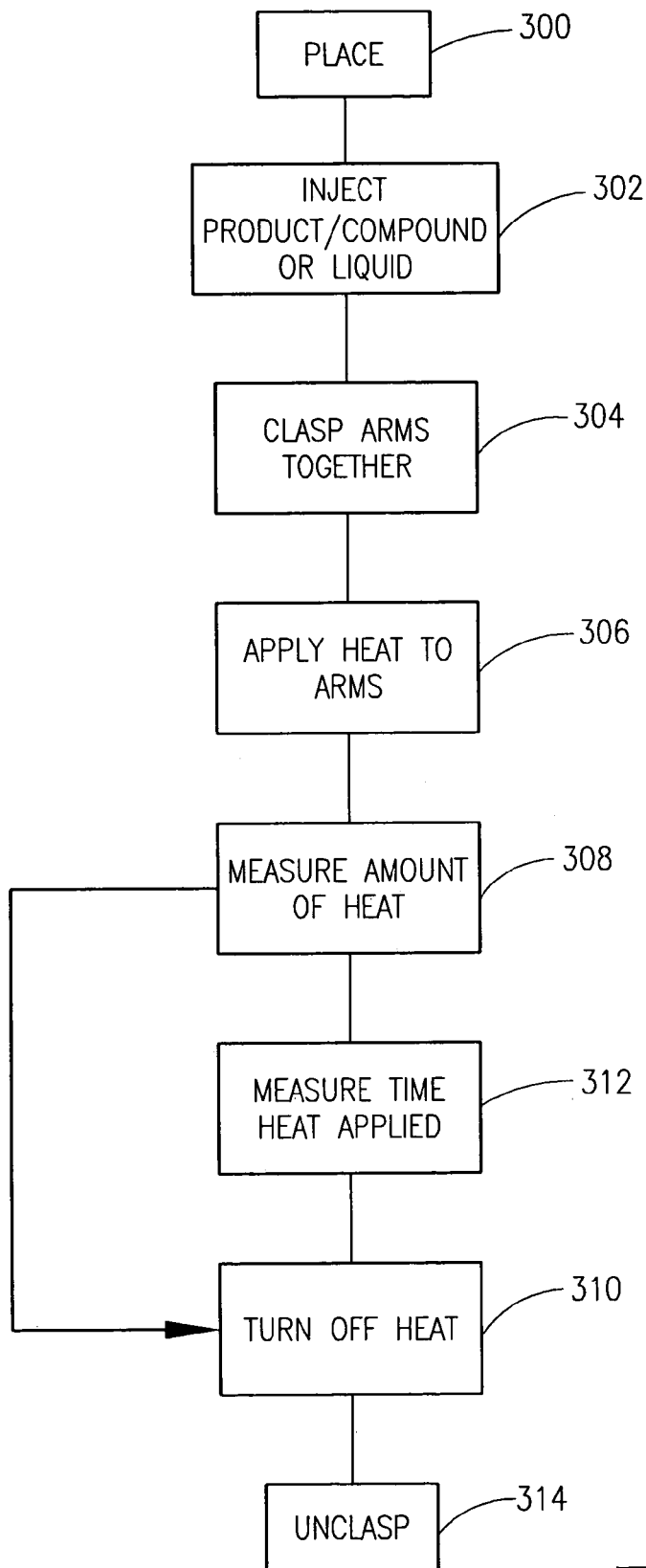
FIG. 9 is a flow chart diagram of the logic employed with the heat sealer device of the present invention.

Referring now to FIG. 9, a flow chart diagram of the logic employed with the heat sealer device of the present invention will now be described. The first step 300 is to place the plurality of interconnected vials into the vial tray holder. The vial tray holder is adapted to contain a row of the interconnected vials, as will be described later in the application. The operator would then place the product, compound and/or liquid into the vials 302; preferably, the product is liquid and the liquid is injected into the vials.

Next, the clamp arms are closed 304 and heat is applied to at least one of the arms 306 (in the preferred embodiment, both arms are heated). The control system, which will be described in greater detail later in the application, will measure the amount of heat 308 via a temperature sensor means. If the temperature exceeds a predetermined limit as sensed by the temperature sensor means, the control system will terminate the applied heat 310. Concurrently therewith, the control system will also measure the amount of time that heat is applied 310. Once a predetermined amount of time has expired (which corresponds to the amount of time to heat seal and encapsulate the vials), the control system will terminate the applied heat 310. The system will allow for a light indicator, such as light emitting diode, to indicate the termination of applied heat. The operator can then unclamp 314 the arms from the row of vials, and thereafter, remove the row of encapsulated interconnected vials.

Figure 10:
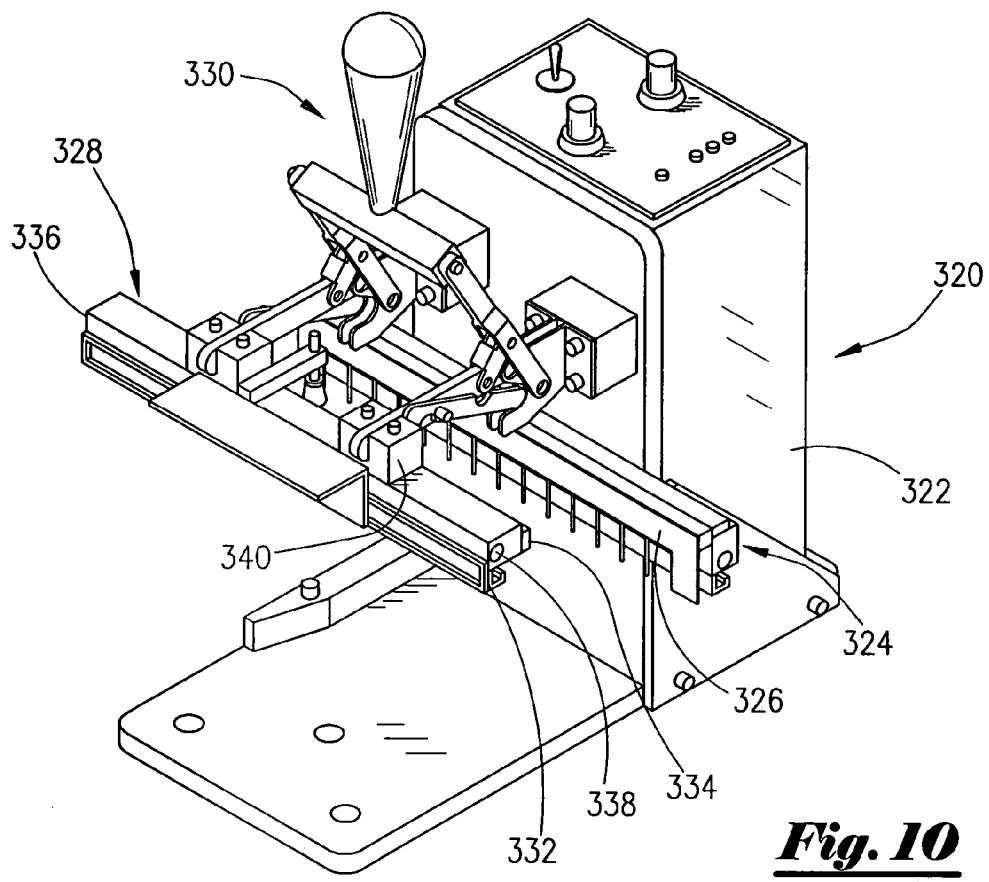
FIG. 10 is a perspective view of the heat sealer device.

In FIG. 10, a perspective view of the heat sealer device 320 will now be described. The main unit 322 contains the electrical components and control system that activates and terminates the heat as previously mentioned. The electrical components and control system will be discussed with relation to FIG. 13 later in the application. The device 320 also contains the stationary arm 324 that is attached to the front side of unit 322. The stationary arm 324 has a first side 326 that is essentially flat. The stationary arm 324 conducts heat generated from the main unit 322 i.e. the arm 324 is heated.

The second arm 328 is movable and will be maneuvered into engagement with the arm 324 via the lever means, seen generally at 330. The second arm 328 comprises a first bar 332 and a second bar 334. The first bar 332 contains a first terminal connector means 336 and a second terminal connector means 338 for suppling an electrical heat to the second arm 328. The second arm 328 is also heated. Both arms are heated in this embodiment, even though it is possible to have only one arm heated for purposes of heat sealing.* . . . The second arm further contains a base 340.

Figure 11:
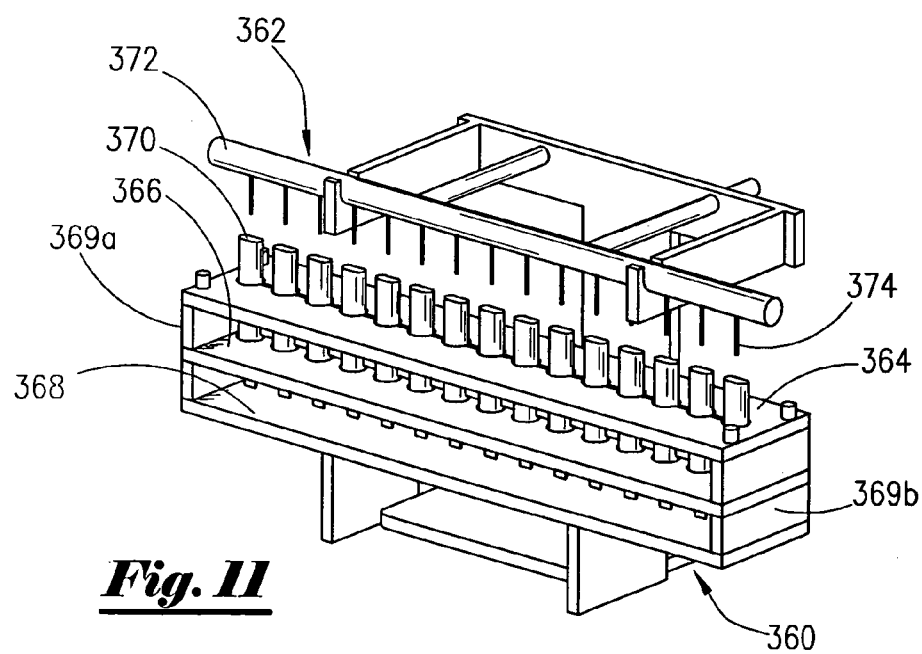
FIG. 11 is a perspective view of the vial tray holder with injection means.

FIG. 11 is a perspective view of the vial tray holder 360 with injection means 362. The holder 360 has a first plate 364 with openings, a second plate 366 with openings, and a third base plate 368. The sides 369a, 369b are included for structural purposes, as will be readily understood by those of ordinary skill in the art. The plurality of interconnected vials produced as per the teachings of this invention is positioned within this holder, through the openings. The open end 370 of the vials face upward as shown in FIG. 11. The injection means can be a linear tubular member 372 having projections 374 therefrom. The projections will be placed above the openings of the vials. In the preferred embodiment, a liquid is injected into the linear tubular member 372, and into the projections, which in turn is delivered into the vials. The liquid, for instance, may be a medicine.

Figure 12:
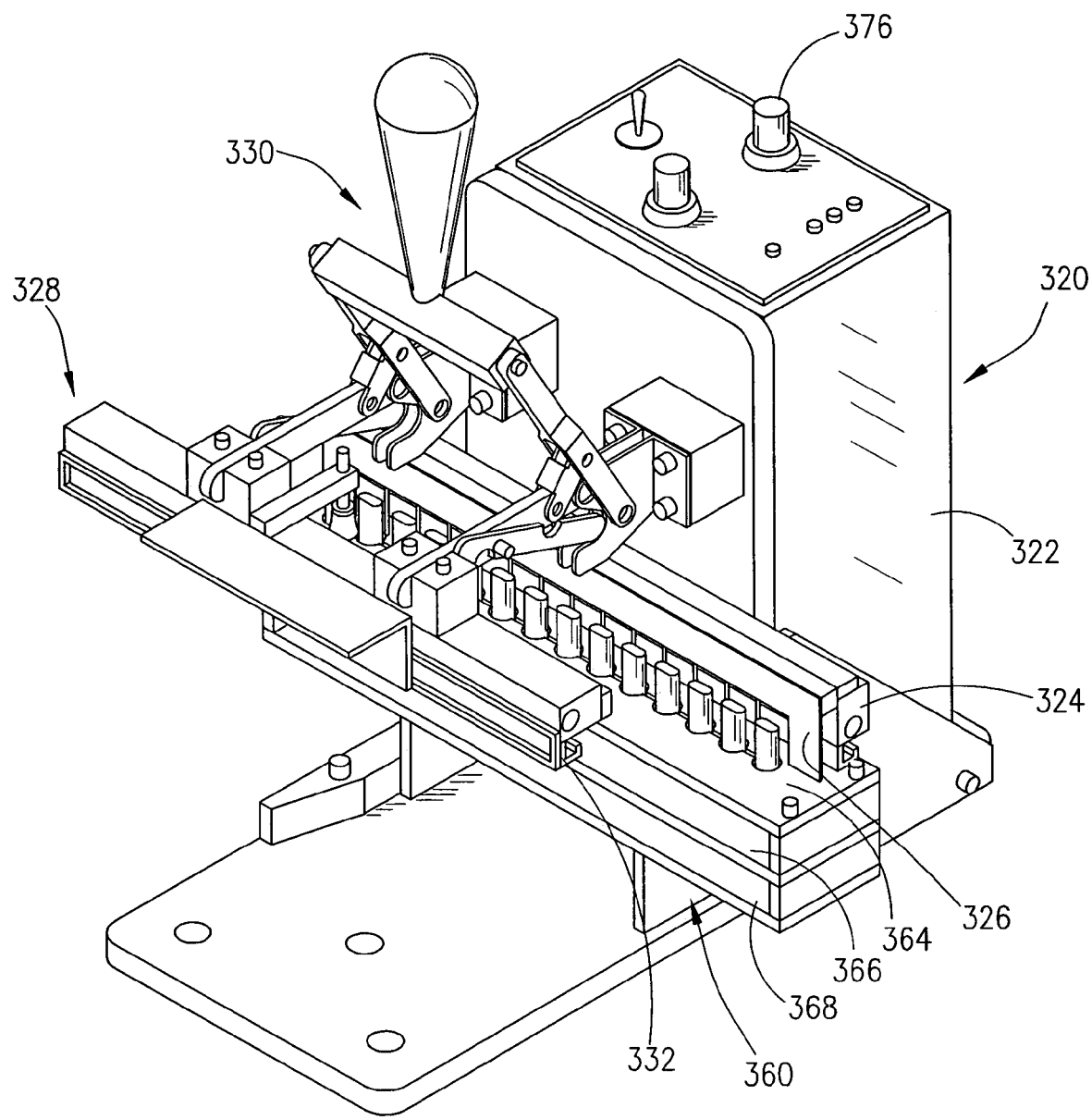
FIG. 12 is a perspective view of the assembled heat sealer device illustrated in FIG. 10.

FIG. 12 is a perspective view of the assembled heat sealer device illustrated in FIG. 10 with the tray holder 360 positioned there below. Hence, the operator would simply pull on the handle of the lever means 330 which would in turn pivot the arm 328 into contact with the arm 324. The vial ends are sandwiched between the two arms. Heat is applied as earlier stated thereby sealing the vials. Applying the logic of FIG. 9 for instance, the control system activates a light when the heating process is complete. The operator would then simply lift the handle, and then remove the tray 360.

Figure 13:
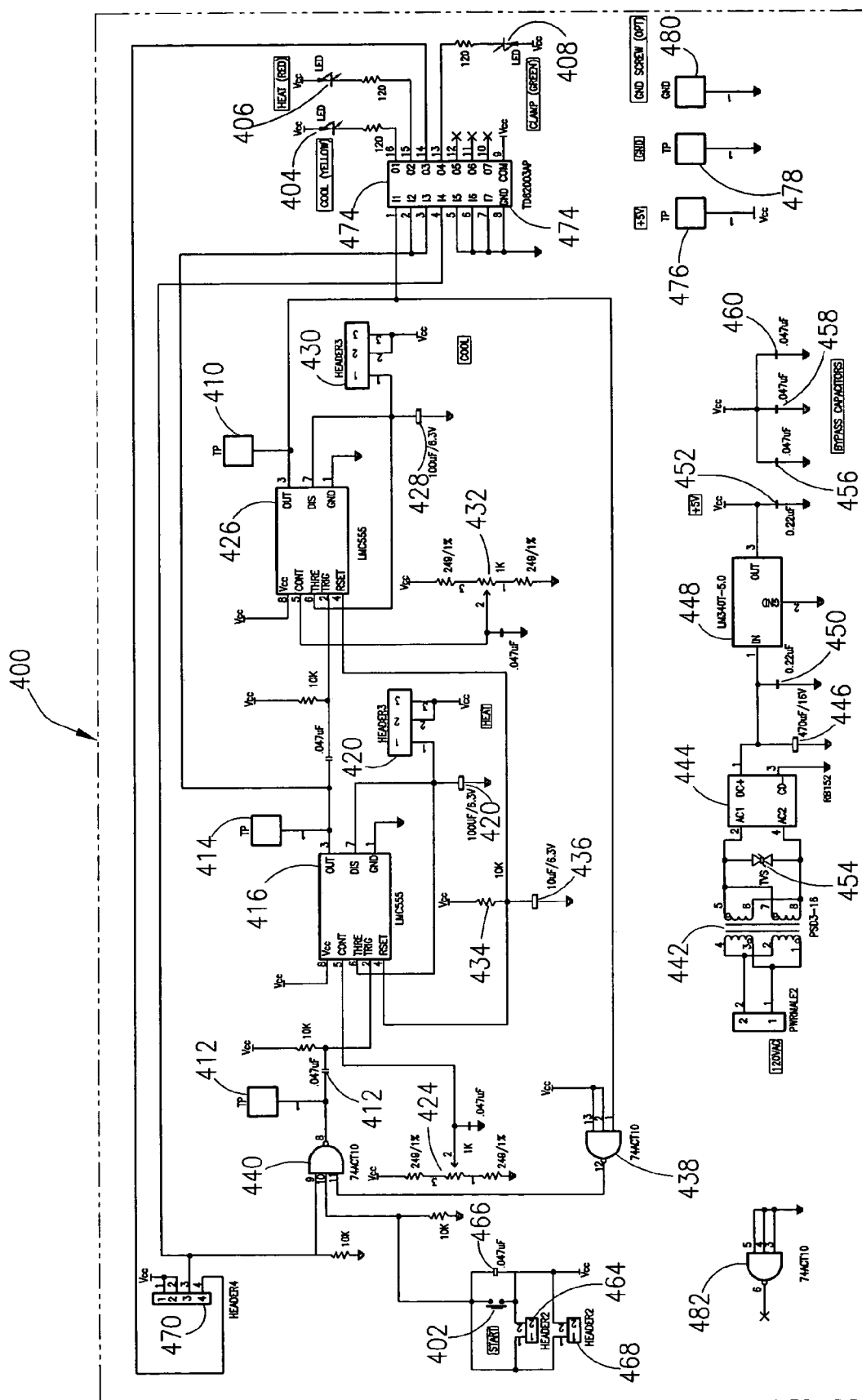
FIG. 13 is an illustration of the electrical components used with the heater sealer device of FIG. 10.

FIG. 13 is an illustration of the electrical components used with the heater sealer device of FIG. 10 as set out on the circuit board of the present invention. The control system 400 is used to control the operation of the heat sealing system herein disclosed. It allows independent control of the heating and cooling periods, with adjustment ranges of 0.1–10 seconds for each cycle. The heating cycle is disabled when the cooling cycle is operational. Switch contact closure from a clamp micro-switch ensures that the heating cycle cannot begin unless the vials to be sealed are in place. The circuit may be triggered by pressing the PC board-mounted push button switch 402 or by contact closure from an external foot-switch. Three LED indicators (404, 406, 408) display the status of the board during the clamp, heating and cooling cycles. Test points 410, 412, 414 are provided on the board for use in calibration and troubleshooting. An external solid state relay is used to control current flow in the heater elements during the heat cycle.

The circuit consist of two cascaded one-shot multi-vibrator circuits, gating logic, and an AC power supply. Heating and cooling period calibration requires the adjustment of two board-mounted trimmer potentiometers.

One-shot multi-vibrator 416 (available from National Semiconductor under the part number lmc555 cn) controls the heating cycle. A negative-going pulse at capacitor 418 (available from Panasonic under the part number ecu-s1h473kbb) triggers the timer. The width of the heat pulse is determined by timing capacitor 420 (available from Sprague under the part number 199d107x96r3da1) and an external 100 k ohm, ten-turn, wire-wound potentiometer that is connected at header 422 (available from Molex under the parts number 22-23-2031). Adjusting potentiometer 424 (available from Bourns under the parts number 3386p-1-102) performs pulse width calibration. The wiper's voltage alters the threshold voltage for the integrated circuit (IC) 416, varying the pulse width accordingly.

Similarly, one-shot multi-vibrator 426 (available from National Semiconductor under the parts number lmc555 cn) controls the cooling cycle. The falling edge of the timer integrated circuit 416 output pulse triggers 426. The width of the cool pulse is determined by timing capacitor 428 (available from Sprague under the parts number 199d107x96r3da1) and an external potentiometer connected at header 430 (available from Molex under the parts number wm4201-nd). Adjusting potentiometer 432 (available from Bourns under the parts number 3386p-1-102) performs width calibration.

Resistor 434 (available from Yageo under the parts number cfr-25jb10k) and capacitor 436 (available from Sprague under the parts number 199d106x96r3aa1) prevent the multi-vibrators from triggering when AC power is first applied. The reset pins on IC 426 and IC 416 and held low unit Vcc has stabilized. Once capacitor 436 has charged, the reset pins are held at Vcc potential. This configures IC 426 and IC 416 for operation as one-shot multi-vibrators.

To lock out the heating cycle during the cooling period, NAND gate 438 (available from Fairchild under the parts number 74act10pc) disables the trigger switch path. Once the output of IC 426 returns to a low state, IC 438 is held high. NAND gate 440 (available from Fairchild under the parts number 74act10pc) is then able to recognize the clamp switch and trigger switch contact closures.

The AC power supply consists of transformer 442 (available from Microtran Tamura under the parts number psd3-16), bridge rectifier 444 (available from Microsemi under the parts number rb152), capacitor 446 (available from Philips under the parts number 2222-021-35471), and IC voltage regulator 448 (available from National Semiconductor under the parts number lm340t-5.0-nd). Capacitors 450, 452 (available from Panasonic under the parts number ecu-s1h224kbb) stabilize voltage regulator 448 under varying load conditions. Transient suppressor 454 (available from Diodes, Inc. under the parts number 1.5ke24ca) protects regulator 448 from AC power line spikes. Capacitors 456, 458, 460 (available from Panasonic under the parts number ecu-s1h473kbb) are used to bypass integrated circuits 426, 416 and 438U4, respectively.

Push-button switch 402 (available from C & K under the parts number pt11sh9abe) initiates operation of the timer circuitry. Alternately, an external foot switch can be connected to header 464 (available from Molex under the parts number 22-23-2021) to perform the same operation. Capacitor 466 (available from Panasonic under the parts number ecu-s1h473kbb) provides transient protection and eliminates false triggering of the circuit due to static discharge. An alternate switch configuration is also possible with this design. When push-button 402 is not installed, an additional two-pin header would be installed at location 468 (available from Molex under the parts number 22-23-2021). An external push-button would then be connected to header 468.

The clamp switch connects to the PC board at header 470 (available from Molex under the parts number 22-23-2041), pins 1 and 3. The input of the solid state relay connects to pins 2 and 4. Driver 472 (available from Toshiba under the parts number td62003ap) controls operation of the HEAT, COOL, and CLAMP LEDs as well as current flow to the input of the solid state relay. During the heating cycle, the output of the timer IC 416 is high. This causes IC 474, pin 15 (available from Toshiba under the parts number td62003ap) to go low, turning on LED 406. Simultaneously, IC 474, pin 14 goes low, providing current flow for the input path of the solid state relay. Similarly, IC 474, pin 16 goes low during the cooling cycle and 474, pin 13 goes low when the clamp switch is closed. It should also be noted that test points 476, 478 (available from Keystone, vendor category number 5013k-nd and 5011k-nd respectively) ground 480 and a NAND gate 482 similar to 438 is included.

Changes and modifications in the specifically described embodiments can be carried out without departing from the scope of the invention which is intended to be limited only by the scope of the appended claims.

I claim:

1. A method of molding a plurality of interconnected vials comprising:
    providing a plurality of core pins and an insert means containing a first slide and a second slide having an extended position and a contracted position;
    contracting said first slide and said second slide from the extended position to the contracted position to form a plurality of cavity profiles linked together by a plurality of arms;
    positioning a plurality of core pins into said plurality of cavity profiles so that said plurality of core pins are free standing within said plurality of cavity profiles;
    injecting a plastic fluid about said plurality of core pins to form a plurality of interconnected vials;
    removing said plurality of interconnected vials;
    placing a compound into said plurality of interconnected vials; and,
    heat sealing an open end of said plurality of interconnected vials such that each of said plurality of interconnected vials forms a closed container that encapsulates said compound, and wherein the step of heat sealing includes:
    clamping the plurality of interconnected vials into a heat sealing device;
    applying heat to the heat sealing device;
    measuring the temperature of the applied heat;
    measuring the time heat is applied to said heat sealing device.

2. A method of manufacturing a row of encapsulated interconnected vials with a mold having a first member having attached thereto a plurality of core pins and wherein the method comprises:
    forming a plurality of cavity profiles linked together by a plurality of arms by contracting an insert means;
    inserting the plurality of core pins on said first member into said plurality of cavity profiles so that said plurality of core pins are free standing;
    injecting a plastic fluid about said plurality of core pins to form the row of interconnected vials;
    removing the row of interconnected vials from the mold;
    positioning the row of interconnected vials into a holder tray for holding the row of interconnected vials;

placing a liquid into the row of interconnected vials with a linear injection means for delivering the liquid into the row of interconnected vials;

heat sealing an open end of the plurality of interconnected vials so that each of the interconnected vials forms a closed container that encapsulates the liquid, and wherein the step of heat sealing includes:

clamping the row of interconnected vials into a heat sealing device;

applying heat to the heat sealing device;

measuring the temperature of the applied heat;

measuring the time heat is applied to said heat sealing device.

3. The method of claim 2, further comprising:

terminating the heat applied to a first arm of said heating sealing device after a predetermined time;

unclasping the a first arm from a second arm of said heating sealing device;

removing the row of interconnected vials from said holder.

4. The method of claim 3 wherein the step of placing the liquid into the row of interconnected vials includes measuring a predetermined amount of compound and injecting the predetermined amount of the compound into the row of interconnected vials.

5. The method of claim 4, wherein the step of heat sealing further includes:

setting a predetermined maximum temperature;

exceeding the predetermined maximum temperature;

terminating the heat applied after exceeding the predetermined maximum temperature.

6. A method of molding a row of interconnected vials with a mold, said mold comprising a first member having a first end and a second end; a manifold member operatively attached to said second end of said first member for channeling a plastic fluid to an insert means, with said insert means having an extended position and a contracted position; a second member having a first end and a second end, and wherein said first end of said second member has attached thereto a plurality of core pins contained therein; the method comprising:

heating a plastic so that the plastic is fluidized;

injecting the plastic fluid into the manifold;

contacting said second member with said insert means;

injecting the plastic fluid through said first member;

contracting said insert means;

forming a plurality of cavity profiles within said contracted insert means and wherein said plurality of cavity profiles are in communication forming a plurality of arm contours;

placing said plurality of core pins into said plurality of cavity profiles so that said plurality of core pins are free standing within said plurality of cavity profiles;

injecting the plastic fluid into said plurality of cavity profiles and into said plurality of arm contours interconnected together via a plurality of arms;

expanding the insert means;

ejecting the row of interconnected vials;

placing the row of interconnected vials into a vial holder tray, said vial holder tray configured to hold said row of interconnected vials;

placing a compound within an open end of said plurality of interconnected vials with a linear injection means;

placing the open end of said row of interconnected vials within a heat sealer device;

clamping said row of interconnected vials within said heat sealer device;

applying heat to said heat sealer device.

7. The method of claim 6, wherein the step of applying heat further comprises:

measuring the amount of heat applied to a first arm of said heat sealer device;

measuring the time the heat is applied to said first arm;

terminating the heat after a predetermined amount of time has expired.

8. The method of claim 7 further comprising:

unclasping said first arm from a second arm of said heat sealer device;

removing said row of interconnected vials from the vial holder tray;

separating said row of interconnected vials.

9. The method of claim 8 wherein the compound is a liquid and the step of placing the liquid into the row of interconnected vials include measuring a predetermined amount of liquid and injecting the liquid into the open end of the row of interconnected vials.

10. The method of claim 9 wherein said first member further comprises a plurality of cast heaters operatively associated with said insert means, and wherein the step of maintaining the plastic fluid at a constant temperature comprises:

heating the plastic fluid with said cast heaters;

and wherein the step of channeling the plastic fluid through said first member and into said insert means includes flowing the plastic fluid through said cast heater so that the plastic fluid is maintained at a constant temperature.

* * * * *